US011924157B2

(12) United States Patent
Liao

(10) Patent No.: US 11,924,157 B2
(45) Date of Patent: Mar. 5, 2024

(54) EMAIL FORWARDING METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/883,070

(22) Filed: Aug. 8, 2022

(65) Prior Publication Data

US 2022/0385619 A1    Dec. 1, 2022

Related U.S. Application Data

(63) Continuation of application No. PCT/CN2021/085584, filed on Apr. 6, 2021.

(30) Foreign Application Priority Data

Apr. 30, 2020 (CN) .......................... 202010368196.5

(51) Int. Cl.
*H04L 51/42* (2022.01)
*H04L 51/046* (2022.01)

(52) U.S. Cl.
CPC ............ *H04L 51/42* (2022.05); *H04L 51/046* (2013.01)

(58) Field of Classification Search
CPC ..... H04L 51/23; H04L 51/04; G06F 3/04817; G06F 3/0482; G06F 3/04845;

(Continued)

(56) References Cited

U.S. PATENT DOCUMENTS 7,640,204 B2 * 12/2009 Florance .............. G06Q 50/188
705/28
8,886,243 B1   11/2014 Pabla et al.
(Continued)

FOREIGN PATENT DOCUMENTS

CN          101047656 A        10/2007
CN          104883296 A         9/2015
(Continued)

OTHER PUBLICATIONS

International Search Report dated Jul. 8, 2021 in International Patent Application No. PCT/CN2021/085584 (10 pages) with English translation (2 pages).
(Continued)

*Primary Examiner* — Ninos Donabed

(57) ABSTRACT

A method and a device for forwarding an email, an electronic device, and a storage medium are provided. The method includes: determining a to-be-forwarded email group and a target object, in response to a detection of an email forwarding operation, wherein the target object comprises one or more of a target instant messaging IM group and a target IM user; and forwarding an email group to the target object and displaying the email group in the target object. The to-be-forwarded email group and the target object are determined, and the email group is forwarded to the target object, to display the email group in the target object. In this way, the email group can contain multiple emails, multiple emails can be simultaneously forwarded, thereby having simple and convenient operations, increasing the efficiency of email forwarding, and satisfying the working requirements of a user.

22 Claims, 9 Drawing Sheets

(58) Field of Classification Search
CPC .. G06F 3/0484; G06F 3/0481; G06F 3/04847; G06F 3/04883; G06F 3/0488; G06F 3/04842
See application file for complete search history.

(56) References Cited

U.S. PATENT DOCUMENTS

| | | | | |
|---|---|---|---|---|
| 9,871,753 | B2* | 1/2018 | Parashar | H04L 51/214 |
| 10,051,103 | B1* | 8/2018 | Gordon | G06F 9/451 |
| 10,893,099 | B2* | 1/2021 | Dennis | G06F 16/951 |
| 2001/0003189 | A1* | 6/2001 | Miyazawa | H04L 67/75 709/206 |
| 2002/0087479 | A1 | 7/2002 | Malcolm | |
| 2004/0078447 | A1* | 4/2004 | Malik | H04L 69/08 709/206 |
| 2006/0236266 | A1* | 10/2006 | Majava | G06F 3/0481 715/810 |
| 2006/0248150 | A1* | 11/2006 | Chaar | G06F 3/0482 709/206 |
| 2007/0208802 | A1* | 9/2007 | Barman | H04L 51/04 709/203 |
| 2007/0219961 | A1* | 9/2007 | Burgel | G06F 16/951 |
| 2007/0240081 | A1* | 10/2007 | Grossman | G06Q 10/10 715/854 |
| 2008/0028026 | A1* | 1/2008 | Chen | G06Q 10/107 709/206 |
| 2008/0091454 | A1* | 4/2008 | Fisher | G06Q 10/10 705/301 |
| 2008/0189301 | A1* | 8/2008 | Chen | G06Q 10/10 |
| 2008/0222717 | A1* | 9/2008 | Rothstein | H04L 63/1416 726/14 |
| 2009/0157818 | A1* | 6/2009 | Cook | G06F 3/04817 709/206 |
| 2009/0174668 | A1* | 7/2009 | Cho | G06F 3/0482 345/169 |
| 2009/0206059 | A1* | 8/2009 | Kiko | H02J 13/00017 218/143 |
| 2009/0327438 | A1* | 12/2009 | Cheng | H04L 51/48 709/206 |
| 2010/0011064 | A1* | 1/2010 | Mabry | G06Q 10/107 709/206 |
| 2010/0191572 | A1* | 7/2010 | Newman | G06Q 30/0631 705/26.7 |
| 2010/0250693 | A1 | 9/2010 | Zheng et al. | |
| 2011/0119771 | A1* | 5/2011 | Postoyko | G06F 21/6209 726/28 |
| 2011/0231499 | A1* | 9/2011 | Stovicek | H04L 51/42 709/206 |
| 2013/0007167 | A1 | 1/2013 | Smith et al. | |
| 2013/0040612 | A1* | 2/2013 | Kumar | H04M 3/42382 455/413 |
| 2013/0097253 | A1* | 4/2013 | Mencke | H04L 67/535 709/204 |
| 2013/0198653 | A1* | 8/2013 | Tse | G06F 3/0484 715/751 |
| 2014/0040402 | A1* | 2/2014 | Johnson | G06Q 10/107 709/206 |
| 2014/0096033 | A1* | 4/2014 | Blair | H04L 51/56 715/752 |
| 2014/0273957 | A1* | 9/2014 | Reitz | H04W 12/06 455/411 |
| 2014/0379820 | A1* | 12/2014 | Carson | H04L 51/48 709/206 |
| 2015/0095429 | A1* | 4/2015 | Gaines | H04L 51/02 709/206 |
| 2015/0117619 | A1* | 4/2015 | Carpenter | G07C 9/00182 379/39 |
| 2015/0254109 | A1* | 9/2015 | Chandramouli | G06F 3/04842 718/1 |
| 2016/0301643 | A1* | 10/2016 | Parashar | H04L 51/214 |
| 2016/0337277 | A1 | 11/2016 | Dong et al. | |
| 2017/0078233 | A1* | 3/2017 | Cook | H04L 51/216 |
| 2017/0083523 | A1* | 3/2017 | Philip | G06F 16/248 |
| 2017/0094078 | A1* | 3/2017 | Ohara | H04N 1/00042 |
| 2017/0277424 | A1* | 9/2017 | Witkowski | A63F 13/87 |
| 2018/0032997 | A1* | 2/2018 | Gordon | G06Q 30/0269 |
| 2018/0095940 | A1* | 4/2018 | Meixner | H04L 51/046 |
| 2018/0097902 | A1* | 4/2018 | Meixner | G06F 3/0481 |
| 2019/0020687 | A1* | 1/2019 | Noon | H04L 51/212 |
| 2019/0261484 | A1* | 8/2019 | Krajnc | H05B 47/125 |
| 2019/0379654 | A1* | 12/2019 | Yoskowitz | G06F 21/31 |
| 2020/0184511 | A1* | 6/2020 | Goenka | H04L 51/046 |
| 2021/0117972 | A1* | 4/2021 | Johnson | G06N 5/025 |
| 2021/0142423 | A1* | 5/2021 | Randall | G06F 3/04886 |
| 2022/0385619 | A1* | 12/2022 | Liao | H04L 51/56 |

FOREIGN PATENT DOCUMENTS

| | | |
|---|---|---|
| CN | 105897553 A | 8/2016 |
| CN | 106302081 A | 1/2017 |
| CN | 108055197 A | 5/2018 |
| CN | 108306810 A | 7/2018 |
| CN | 109104360 A | 12/2018 |
| CN | 109918345 A | 6/2019 |
| CN | 110855547 A | 2/2020 |
| JP | 2009077091 A | 4/2009 |
| JP | 2016071717 A | 5/2016 |
| JP | 2019207500 A | 12/2019 |
| WO | 2002039331 A2 | 5/2002 |

OTHER PUBLICATIONS

Extended European Search Report dated Aug. 9, 2023 in European Application No. 21797856.8 (9 pages).
Notice of Reasons for Refusal dated Dec. 26, 2023 in Japanese Application No. 2022-563888, with English translation (20 pages).

* cited by examiner

| | Search | 📋 🗓 ⓘ 📅 ☑ ▽ ⚙ | Does this recommended email select? |
|---|---|---|---|
| Inbox | All emails ▽ | aaa Send to chat | ⓎⒺⓈ ⓃⓄ |
| Outbox | Zhangsan 11:01<br>Re:123<br>Hello ② | From: Wangsan<wangsan@xxx.com><br>To: Me<br>Time: December 25, 2020 | |
| Drafts | Lisi 12:31<br>123<br>Hello | #The following are forwarded email<br>From:Wangsan<wangsan@xxx.com> | |
| Deleted Items | Wangsan 14:21<br>aaa<br>Content of the meeting<br>mainly includes… ② | To:Me<br>Time:December 25, 2020<br>Please check the work schedule for<br>next week | |
| Junk Email | | | |
| Shared Emails | Wangwu 15:21<br>bbb<br>Today's tasks are<br>arranged as follows: ④ | From:Wangsan<wangsan@xxx.com><br>To:Wangwu<wangwu@xxx.com<br>Time:2020.12.24 11.25 | |
| | Wangsi 15:41<br>ccc<br>Using the x solution as<br>a modified solution | Please check the work schedule for next week | |
| | Lisan 16:51<br>ddd<br>Notification of works:… | | |

Figure 2(b)

301 — A to-be-forwarded email group and a target object are determined in response to a detection of an email forwarding operation 302 — A to-be-forwarded email selected by the forwarder from the to-be-forwarded email group is determined 303 — The to-be-forwarded email is forwarded to the target IM group object and displayed in the target IM group object

EMAIL FORWARDING METHOD AND APPARATUS, ELECTRONIC DEVICE, AND STORAGE MEDIUM

This application is a continuation of International Application No. PCT/CN2021/085584, filed on Apr. 6, 2021, which claims priority to Chinese Patent Application No. 202010368196.5, titled "EMAIL FORWARDING METHOD AND APPARATUS, ELECTRONIC DEVICE, AND STORAGE MEDIUM", filed on Apr. 30, 2020 with the China National Intellectual Property Administration, both of which are incorporated herein by reference in their entireties.

FIELD

Embodiments of the present disclosure relate to the field of communication technology, and in particular, to a method and a device for forwarding an email, an electronic device, and a storage medium.

BACKGROUND

At present, in order to inform other people of a received message more conveniently in a process of online messaging, for example, in order to view an existing email by one or more user simultaneously, the email is usually forwarded to designated users.

When the present disclosure is envisaged, it is found that only one email can be forwarded in one operation process in some implementations. When multiple emails needs to be forwarded to one or more users, the same operation process has to be performed many times to forward the multiple emails. Therefore, the email forwarding method in the conventional technology is complicated to operate, causing a reduced email forwarding efficiency and failing to meet a work requirement of a user.

SUMMARY

A method and a device for forwarding an email, an electronic device, and a storage medium are provided in the present disclosure, in order to forward an email group.

In a first aspect, a method for forwarding an email is provided according to an embodiment of the present disclosure. The method includes: determining a to-be-forwarded email group and a target object, in response to a detection of an email forwarding operation, where the target object includes one or more of a target instant messaging IM group and a target IM user; and forwarding an email group to the target object and displaying the email group in the target object.

In a second aspect, a device for forwarding an email is provided according to an embodiment of the present disclosure. The device includes: a to-be-forwarded email group and target object determining module configured to determine a to-be-forwarded email group and a target object, in response to a detection of an email forwarding operation, where the target object includes one or more of a target instant messaging IM group and a target IM user; and an email group forwarding module configured to forward an email group to the target object and display the email group in the target object.

In a third aspect, an electronic device is provided according to an embodiment of the present disclosure. The electronic device includes: one or more processors; and a storage device configured to store one or more programs.

The one or more programs, when executed by the one or more processors, cause the one or more processors to implement the method according to any one of the embodiments of the present disclosure.

In a fourth aspect, a computer-readable storage medium is provided according to an embodiment of the present disclosure. The computer-readable storage medium has a computer program stored thereon. The computer program, when executed by a processor, performs the method according to any one of the embodiments of the present disclosure.

A method and device for forwarding an email, an electronic device, and a storage medium are provided according to embodiments of the present disclosure. A to-be-forwarded email group and a target object are determined, and the email group is forwarded to the target object and displayed in the target object. Due to multiple emails in the email group, the multiple emails may be forwarded simultaneously through a simple and convenient operation, improving an email forwarding efficiency and thereby satisfying work requirement of the user.

BRIEF DESCRIPTION OF THE DRAWINGS

The above and other features, advantages and aspects of various embodiments of the present disclosure will become more apparent when taken in conjunction with the accompanying drawings and with reference to the following detailed embodiments. Same reference numerals in the drawings indicate the same or similar elements. It should be understood that the components and elements are not necessarily drawn to scale.

FIG. 1(*b*) is a schematic diagram of an email client interface for determining a to-be-forwarded email group according to the first embodiment of the present disclosure;

FIG. 1(*c*) is a schematic diagram of an interface for selecting a target object according to the first embodiment of the present disclosure;

FIG. 2(*b*) is a schematic diagram of an email client interface for determining a to-be-forwarded email group according to the second embodiment of the present disclosure;

FIG. 3(*b*) is a schematic diagram of an email client interface for determining a to-be-forwarded email according to the third embodiment of the present disclosure;

FIG. 4(*b*) is a schematic diagram of a display interface for a message card according to the fourth embodiment of the present disclosure;

FIG. 4(*c*) is a schematic diagram of a display interface after a click for a message card in a target object is detected according to the fourth embodiment of the present disclosure;

FIG. 4(*d*) is a schematic diagram of a display interface for an enclosed document in a target object according to the fourth embodiment of the present disclosure;

DETAILED DESCRIPTION

Figures 1A, 1B:
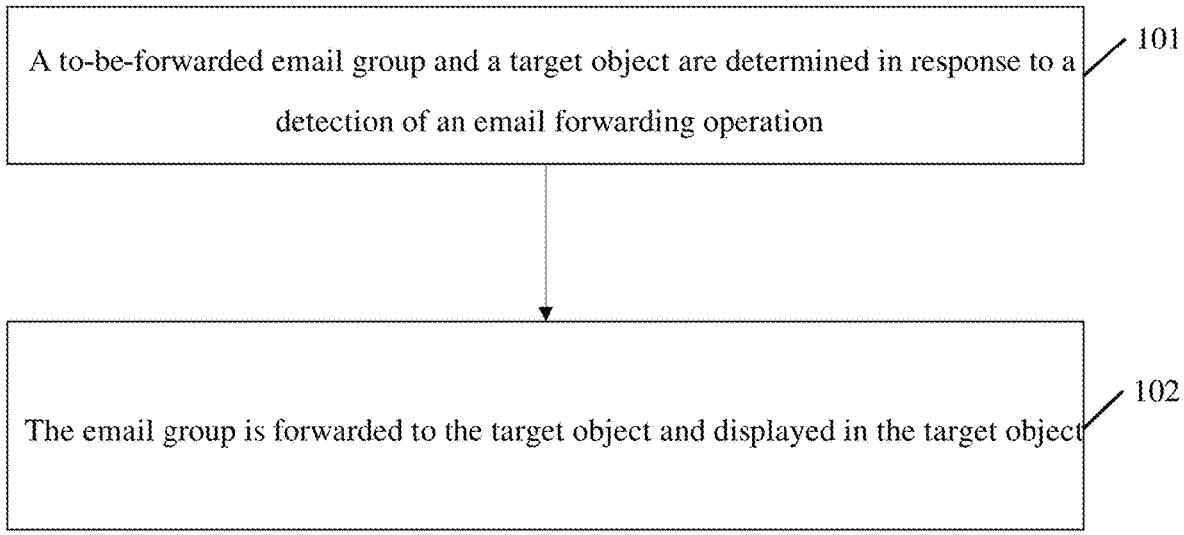
FIG. 1(*a*) is flowchart of a method for forwarding an email according to a first embodiment of the present disclosure.

Embodiments of the present disclosure are described in more detail below with reference to the accompanying drawings. Although some embodiments of the present disclosure are shown in the drawings, it should be understood that the present disclosure may be implemented in various forms and should not be construed as limited to the embodiments set forth herein, and the embodiment are provided for a purpose of a more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

Term "include" and variations thereof used herein refer to an open-ended inclusion, i.e., "include but is not limited to". Term "based on" means "based at least in part on." Term "an embodiment" means "at least one embodiment". Term "another embodiment" means "at least one additional embodiment". Term "some embodiments" means "at least some embodiments". Relevant definitions of other terms are given in the description below.

It should be noted that concepts such as "first" and "second" mentioned in the present disclosure are only used to distinguish different devices, modules or units from each other, and are not intended to limit an order or interdependence of functions performed by these devices, modules or units.

It should be noted that the modifying expressions of "one" and "a plurality of" mentioned in the present disclosure are illustrative rather than limiting, and those skilled in the art should understand that unless indicated in the context clearly otherwise, the expressions should be understood as "one or more".

When envisaging the present disclosure, it is found that only one email can be forwarded in one operation process by a user in some implementations. When multiple emails needs to be forwarded to one or more users, the same operation process has to be performed many times to forward the multiple emails in one implementation. Therefore, the email forwarding method is complicated to operate, causing a reduced email forwarding efficiency and failing to meet the work requirement of the user. In view of this, in some embodiments of the present disclosure, a to-be-forwarded email group and a target object (such as an IM group and/or an IM user) are determined, and the email group is forwarded to the target object to display the email group in the target object. Due to multiple emails in the email group, the multiple emails may be forwarded simultaneously through a simple and convenient operation, improving the email forwarding efficiency and thereby satisfying the work requirement of the user.

Embodiment 1

FIG. 1(*a*) is a flowchart of a method for forwarding an email according to an embodiment of the present disclosure.

The embodiment of the present disclosure is applicable to a case of email forwarding. The method may be executed by a device for forwarding an email provided in embodiments of the present disclosure. The device may be implemented in software and/or hardware, and may generally be integrated in computer equipment. The method according to the embodiment of the present disclosure specifically includes the following steps.

As shown in FIG. 1(*a*), the method in the embodiment of the present disclosure may include steps 101 and 102.

In step 101, a to-be-forwarded email group and a target object are determined in response to a detection of an email forwarding operation.

The email group in this embodiment may be an email session. The email session specifically refers to multiple emails under the same email subject, which are integrated into an email set in a simple conversation style. In this way, all the outgoing and incoming emails are clearly displayed, and an email processing efficiency is improved for a user. Therefore, in the embodiment, the multiple emails in the email group are associated, which generally include common email element information. In an embodiment, the email element information may refer to the same feature information, for example, at least one of the same subject, sending times within a preset time range, the same sender, the same recipient, a replying reference relationship, and a forwarding reference relationship. Apparently, examples in the embodiment are only illustrative, and are not intended to limit a specific content of the same feature information, i.e., the email element information.

The target object may include one or more of a target instant messaging (IM) group and a target IM user. The target IM group refers to an IM group determined as an email forwarding target. The target IM user refers to an IM user determined as an email forwarding target. The IM user may refer to any contact in an IM client device of a forwarder. The IM group may refer to any group created in the IM client device of the forwarder, by which users in the IM group may communicate in a group conversation interface. The IM group may be created based on at least three IM users.

In an embodiment, the determining a to-be-forwarded email group may include: determining an email group selected by a forwarder on an email client interface; and taking the determined email group as the to-be-forwarded email group. Specifically, a selection operation for the email group triggered by the forwarder on an email client interface may be received, and then the selected email group is determined as the to-be-forwarded email group, based on the selection operation. In this way, a to-be-forwarded email may be determined in response to the selection operation of the forwarder on the email client interface. Since the email group includes multiple emails, the multiple emails may be forwarded simultaneously with a simple and convenient operation, thereby improving the email forwarding efficiency.

In an embodiment, the determining a target object may include: determining the target object selected by the forwarder through an email display interface of the to-be-forwarded email group, as the target object.

In an example, in response to the detection of an email forwarding operation, the to-be-forwarded email group may be determined through a method as follows.

FIG. 1(*b*) is a schematic diagram of an email client interface for determining a to-be-forwarded email group according to an embodiment of the present disclosure. The email group selected by the forwarder on the email client interface is determined. The email group may specifically be selected from email groups under a mailbox label. In other words, an email label is first selected and determined, and then an email group is selected under the determined email label. The mailbox label specifically refers to folder icons for saving email groups, such as inbox, outbox, and the like in a first column in FIG. 1(b). Each mailbox label includes at least one email group. The mailbox label and the email group selected by the forwarder are represented with slant lines. Thus, the mailbox label selected by the forwarder is determined as outbox, and the email group with a serial number 1 in the outbox is selected as the to-be-forwarded email group. The email group with the serial number 1 in the outbox includes two emails with the same subject and sender.

It should be noted that, in an embodiment, after the to-be-forwarded email group is determined, it may be further determined whether to automatically forward a subsequent new email belonging to the to-be-forwarded email group. For example, the email may be automatically forwarded or not forwarded according to an instruction of a forwarding setting of a user. Specifically, the user may control whether to automatically forward the email by a triggering operation on an operation control. In the case where the triggering operation of the user on the operation control is not received, the email may be automatically forwarded based on a default setting. For example, assuming that an automatic forwarding operation triggered by the user on the operation control is received, a new email is forwarded to the target object when it is determined that the new email is added to the to-be-forwarded email group.

In some possible implementations, whether a new email is added to the email group can be detected. If it is detected that a first email is newly added to the email group, the newly added first email may be forwarded to the target object and displayed in the target object. In an example, the first email may be added to the email group by the forwarder manually, or may be added to the email group automatically. Specifically, the email client and/or an email server may actively detect feature information of the email. If it is detected that the first email has the same feature information as an email in the email group, the first email is added to the email group.

Figures 1C, 2A:
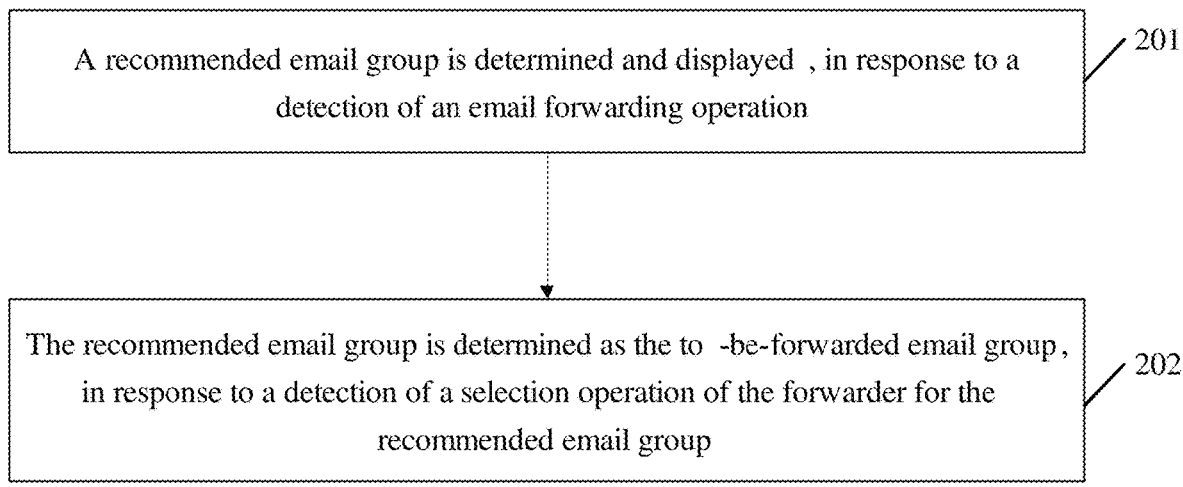
FIG. 2(*a*) is a flowchart of a method for forwarding an email according to a second embodiment of the present disclosure.

In an embodiment, the target object is determined, by determining an object selected by the forwarder through the email display interface of the to-be-forwarded email group as the target object. For example, FIG. 1(b) is a schematic diagram of an email client interface for determining a to-be-forwarded email group. In the embodiments shown in FIG. 1(b) and FIG. 1(c), the target object is an IM group. In the interfaces, the to-be-forwarded email group has been selected by the forwarder, and therefore the third column in FIG. 1(b) is a display interface of the to-be-forwarded email group. At the top of the display interface, the icon in a dotted circle is a selection entry to the target object. A target object selection interface as shown in FIG. 1(c) is represented in response to a detection of a click operation of the forwarder for the selection entry to the target object. According to an operation instruction of the forwarder, it may be determined that the target selected by the forwarder on the target object selection interface is a discussed target object, so that a discussion group 1 is determined as the target object.

In an embodiment, before forwarding the email group to the target object, the method may further include: hiding bodies of multiple emails in the email group; and displaying a subject, a recipient and a sender of each email in the email group, to view a content of the email group by the forwarder.

By hiding the bodies of the multiple emails in the email group, the contents of the multiple emails are folded, the number of emails displayed in one interface is increased, and therefore the forwarder may quickly determine specific information of an email in the email group.

In an embodiment, before forwarding the email group to the target object, the bodies of the multiple emails in the email group may be hidden. For example, in the third column of the email display interface 110 shown in FIG. 1(b), the body of each email is hidden, and the number of emails in the email group displayed in the same interface may be increased, so that the forwarder may quickly view the content of the email group.

In an embodiment, after the email forwarding operation triggered by the forwarder is detected, the method may further include: acquiring identification information of the to-be-forwarded email group.

In an embodiment, an electronic device which receives an operation instruction of the forwarder is communicatively connected to an email server. Thus, the electronic device may acquire the identification information of the to-be-forwarded email group, when the email forwarding operation is detected. One email group corresponds to one piece of identification information, and specific information of the email groups corresponding to the respective pieces of identification information is stored in the email server. For example, it is determined that the to-be-forwarded email group is an email group with a serial number 1 in the outbox in FIG. 1(b) and having identification information 01a. Then, the identification information 01a of the to-be-forwarded email group may be transmitted to the email server in a subsequent step.

In step 102, the email group is forwarded to the target object and displayed in the target object.

In an embodiment, the forwarding the email group to the target object and displaying the email group in the target object may include: transmitting a forwarding request carrying identification information to the email server, to trigger the email server to forward, through an IM server, the email group corresponding to the identification information to the target object, such as the target IM group, and display the email group in the target object. The email group is determined through the email server based on the identification information, and is then forwarded through the IM server to the target object for display. The identification information is uniquely determined, and thus the email group is determined more accurately and accuracy of the email group displayed in the target object is improved.

In an embodiment, the email clients are corresponds through the email server, and the IM client corresponds to the IM server. The email server is communicatively connected with the IM server, so as to implement a communication between the email client and the IM client. That is, the to-be-forwarded email group may be forwarded to the target IM user and/or IM group according to an instruction from the forwarder.

Here, the forwarding may have a broader meaning than email forwarding in a usual sense. Specifically, for example, in some application scenarios, after the email group is forwarded to the target object, a sender of the forwarding operation, as an owner of the email group, may set a permission on a forwarding object (for example, other users in the IM group except for the sender). The permission may include an operation permission and/or time permission. Here, the operation permission may be understood as an operation (such as email replying operation, email forwarding operation and/or email editing operation) that the forwarding object may perform on the email group within a time period indicated by the time permission. In addition, the permission for the email group, which is obtained by the forwarding object through the forwarding operation from the sender, may be controlled and adjusted by the sender. For example, after the email group is forwarded to the target object, the sender may adjust (for example, modify or cancel), through an operation, the time permission and/or operation permission of the forwarding object for the email group.

In a specific implementation, the identification information of the to-be-forwarded email group is determined as 01a. A forwarding request carrying the identification information 01a is transmitted to the email server. For example, the forwarding request specifically indicates "Please forward the 01a email group to the discussion group 1". Since the email server stores specific information of email groups corresponding to the respective pieces of identification information, the email server is triggered to perform matching based on the identification information, so as to obtain the specific information of the email group corresponding to Ola. The obtained specific information of the email group and the discussion group 1 are transmitted to the IM server. The specific information of the email group is forwarded to the discussion group 1 via the IM server, and then is displayed in the discussion group 1.

In an embodiment, the displaying the email group in the target object may include: displaying the email group in the target object in a form of a message card, where the message card includes a subject of the email group and the identification information of the email group. The message card includes only the subject and the identification information of the email group and does not include a body of an email. Thus, storage space of the IM client is saved.

A method for forwarding an email is provided in the embodiments of the present disclosure. In the method, a to-be-forwarded email group and a target object are determined, and the email group is forwarded to the target object and displayed in the target object. Since the email group may include multiple emails, the multiple emails may be forwarded simultaneously with a simple and convenient operation, thereby improving the email forwarding efficiency and satisfying the working requirement of users.

Embodiment 2

FIG. 2(a) is a flowchart of a method for forwarding an email according to an embodiment of the present disclosure. This embodiment of the present disclosure may be combined with the exemplary solutions in the above-mentioned embodiments. This embodiment of the present disclosure mainly describes step 101 in the first embodiment in detail. In this embodiment, the email group is determined in an email recommendation strategy.

As shown in FIG. 2(a), the method in an embodiment of the present disclosure further includes steps 201 to 202.

In step 201, a recommended email group is determined and displayed, in response to a detection of an email forwarding operation.

The recommended email group is recommended by an email client or an email server, and will be forwarded by a forwarder. The recommended email group may be determined based on historical behavior information of the forwarder. In an embodiment, an email recommendation strategy is applied to the determination of the to-be-forwarded email group. The recommended email group may be determined specifically by: acquiring historical email browsing information of the forwarder within a preset time period; determining, based on the historical email browsing information, an email group having a browsing count greater than a preset threshold; and determining the email group having the browsing count greater than the preset threshold, as the recommended email group. The recommended email group is determined based on the historical email browsing information of the forwarder. In this way, the recommended email group is more in line with a forwarding requirement of the user, improving the accuracy of the determination of the recommended email. Apparently, in other possible implementations, the recommended email group may be determined, based on other historical behavior information of the forwarder, such as a frequency of a keyword recently inputted by the forwarder.

FIG. 2(b) is a schematic diagram of an email client interface for determining a to-be-forwarded email group according to an embodiment of the present disclosure. An email browsing record of the forwarder within one hour is acquired in response to the detection of an email forwarding operation. The email group with a serial number 3 in the inbox is determined, based on the email browsing information, to have a browsing count of the forwarder greater than the preset threshold. Thus, the email group with the serial number 3 in the inbox is highlighted on the email client interface. Prompt information "whether to select this recommended mail" is displayed with respect to the email group with the serial number 3, and two selection buttons of "Yes" and "No" are displayed for the forwarder to choose. The preset threshold may be set to 5. That is, an email group is determined as the recommended email group if the forwarder browses this email group more than 5 times within one hour. Apparently, the embodiment is only an example for illustration, and a specific value of the preset threshold will not be limited herein.

In step 202, the recommended email group is determined as the to-be-forwarded email group, in response to a detection of a selection operation of the forwarder for the recommended email group.

Specifically, when a selection operation performed by the forwarder on the recommended email group is detected, it means that the user accepts email recommendation information, and taken the recommended emails as the to-be-forwarded email group.

For example, as shown in FIG. 2(b), in the case where it is detected that a "Yes" button is triggered by the forwarder, that is, in the case where the selection operation performed by the forwarder on the email group with the serial number 3 in the inbox is detected, the email group with the serial number 3 in the inbox is determined as the to-be-forwarded email group. By applying the email group recommendation strategy for forwarding an email group, the time for searching for the to-be-forwarded email group by the forwarder may be saved, thereby further improving the email forwarding efficiency.

In this embodiment, description is made with an example in which one recommended email group is displayed. In practical applications, there may be multiple recommended email groups. In this case, the selection buttons may be displayed correspondingly to each of the multiple recommended email groups for the user to select. In this way, multiple recommended emails may be selected by the forwarder, which may be used as the to-be-forwarded email group together. Therefore, the number of the recommended email groups is not limited in the embodiment.

It should be noted that, in this embodiment, the email recommendation strategy is adopted for determining the to-be-forwarded email group. The other steps in this embodiment are exactly the same as those in the first embodiment, which are not repeated herein.

A method for forwarding an email is provided in the embodiment of the present disclosure. In the method, the above-mentioned email group recommendation strategy is applied for forwarding an email group, which may save time for search for the to-be-forwarded email group by the forwarder, thereby further improving the email forwarding efficiency and satisfying the work requirement of the users.

Embodiment 3

Figures 3A, 3B:
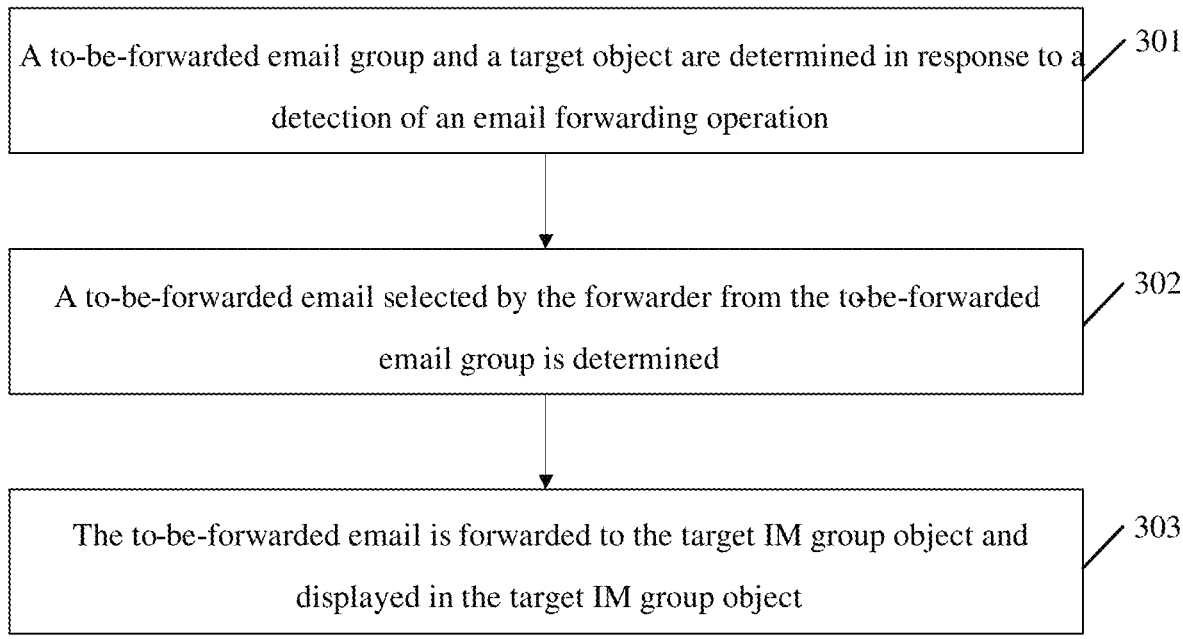
FIG. 3(*a*) is a flowchart of a method for forwarding an email according to a third embodiment of the present disclosure.

FIG. 3(a) is a flowchart of a method for forwarding an email according to an embodiment of the present disclosure. The embodiment of the present disclosure may be combined with the exemplary solutions in the above-mentioned embodiments. According to this embodiment of the present disclosure, after the determining the to-be-forwarded email group mentioned in the first embodiment, the method further includes: determining a to-be-forwarded email selected by the forwarder from the to-be-forwarded email group; and when displaying the to-be-forwarded email group in the target object, specifically displays the to-be-forwarded email.

As shown in FIG. 3(a), the method according to an embodiment of the present disclosure specifically includes steps 301 to 303.

In step 301, a to-be-forwarded email group and a target object are determined in response to a detection of an email forwarding operation.

In an embodiment, the determining the to-be-forwarded email group may include: receiving a selection operation of a forwarder for an email group on an email client interface; and determining, in response to the selection operation, the email group as the to-be-forwarded email group.

In an embodiment, the determining a target object may include: determining an IM group and/or an IM user selected by the forwarder through an email display interface of the to-be-forwarded email group, as the target object.

The method for determining the to-be-forwarded email group and the target object in this embodiment is substantially the same as that in the first embodiment. Therefore, reference may be made to the specific description in the first embodiment, which is not repeated herein.

In step 302, a to-be-forwarded email selected by the forwarder from the to-be-forwarded email group is determined.

In an embodiment, the email group may be forwarded as a whole according to a selection instruction from the forwarder. Alternatively, a to-be-forwarded email selected by the forwarder from the to-be-forwarded email group may be determined after the to-be-forwarded email group is determined. That is, a single email in the email group can be forwarded. Therefore, email forwarding requirements of the users in different scenarios are satisfied and user experience is improved.

In a specific implementation, FIG. 3(b) is a schematic diagram of an email client interface for determining a to-be-forwarded email according to the embodiment. As shown in FIG. 3(b), after the email group with the serial number 1 in the outbox is determined as the to-be-forwarded email group, the to-be-forwarded email group includes two emails, and thus a to-be-forwarded email selected by the forwarder from the to-be-forwarded email group may be determined in response to a reception of an email selection instruction from the forwarder. For example, each email in the email group with the serial number 1 in the outbox is provided with a selection button, and the to-be-forwarded email in the to-be-forwarded email group may be determined in response to a trigger operation of the forwarder on the selection button. In FIG. 3(b), the second email is taken as an example of the to-be-forwarded email for illustration. Therefore, according to the present disclosure, both an entire email group and only some of emails in the email group can be forwarded. Therefore, different email forwarding requirements of the users are satisfied and the user experience is improved.

In step 303, the to-be-forwarded email is forwarded to the target object and displayed in the target object.

In an embodiment, the forwarding the to-be-forwarded email to the target object and displaying the to-be-forwarded email in the target object may include: transmitting a forwarding request carrying identification information to an email server, to trigger the email server to forward the to-be-forwarded email corresponding to the identification information to the target object through an IM server; and displaying the to-be-forwarded email in the target object.

In this embodiment, the method for forwarding the to-be-forwarded email to the target object and displaying the to-be-forwarded email in the target object is substantially the same as the forwarding and displaying method in the first embodiment. Therefore, reference may be made to the detailed description of the email group in the first embodiment, which is not repeated herein.

A method for forwarding an email is provided in the embodiments of the present disclosure. In the method, a forwarder can select a to-be-forwarded email from a to-be-forwarded email group. That is, a single email in the email group is forwarded, thereby satisfying the email forwarding requirements of the users in different scenarios and improving the user experience.

Embodiment 4

Figure 4A:
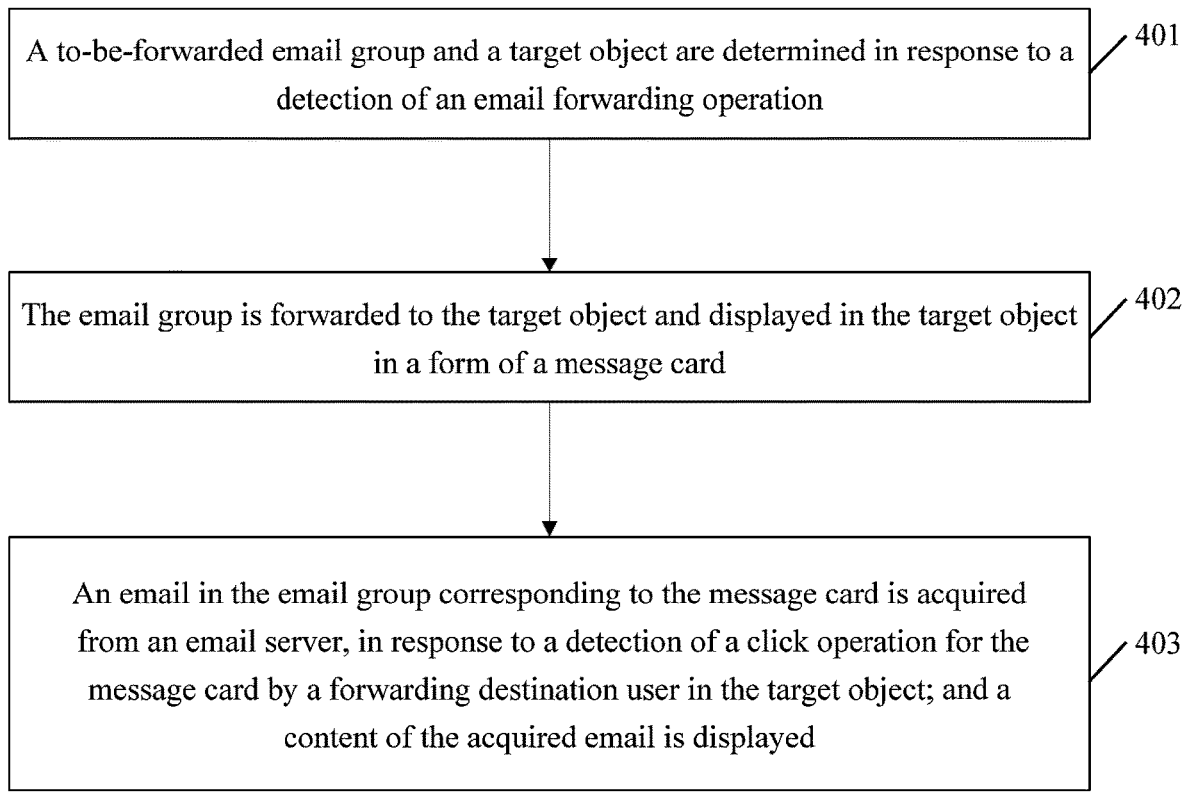
FIG. 4(*a*) is a flowchart of a method for forwarding an email according to a fourth embodiment of the present disclosure.

FIG. 4(a) is a flowchart of a method for forwarding an email according to an embodiment of the present disclosure. The embodiment of the present disclosure may be combined with the exemplary solutions in the above-mentioned embodiments. In the embodiment of the present disclosure, after the email group is displayed in the target object in a card form, the method further includes: acquiring, in response to a detection of a click operation for the message card by a forwarding destination user in the target object, an email in the email group corresponding to the message card from an email server, and displaying a content of the acquired email.

As shown in FIG. 4(a), the method in an embodiment of the present disclosure further includes steps 401 to 403.

In step 401, a to-be-forwarded email group and a target object are determined in response to a detection of an email forwarding operation.

In step 402, the email group is forwarded to the target object and displayed in the target object in a form of a message card.

In an embodiment, the displaying the email group in the target object may include: displaying the email group in the target object in the form of the message card, where the message card includes a subject of the email group and identification information of the email group. Since the message card includes only the subject and the identification information of the email group and does not include a body of an email, a storage space of an IM client is saved.

Figure 4B:
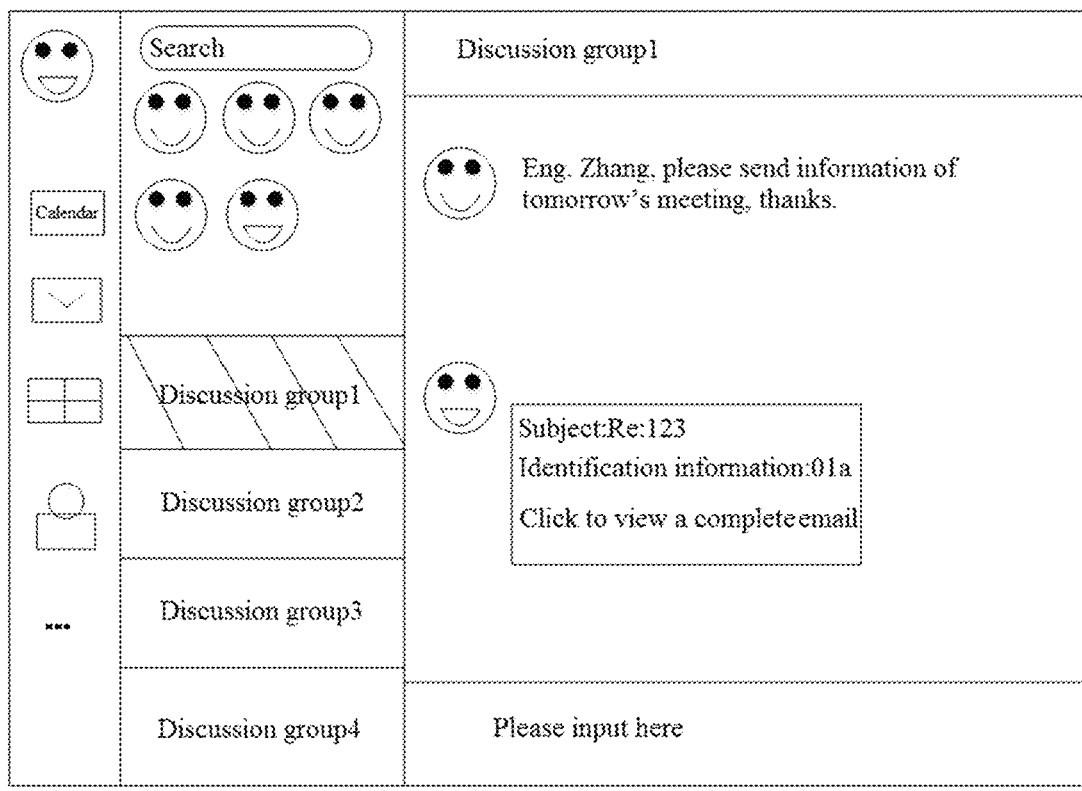

FIG. 4(b) is a schematic diagram of a display interface for a message card according to an embodiment. In the embodiment shown in FIG. 4(b), the target object is a discussion group 1. The email group with the serial number 1 in the outbox shown in FIG. 1(b) is forwarded by the forwarder and is displayed to the discussion group 1 in a card form. The card further includes a trigger button, such as a button with a text "click to view the full email", by which a forwarding destination user may view a full content of the email group.

In step 403, an email in the email group corresponding to the message card is acquired from an email server, in response to a detection of a click operation for the message card by a forwarding destination user in the target object; and a content of the acquired email is displayed.

Figure 4C:
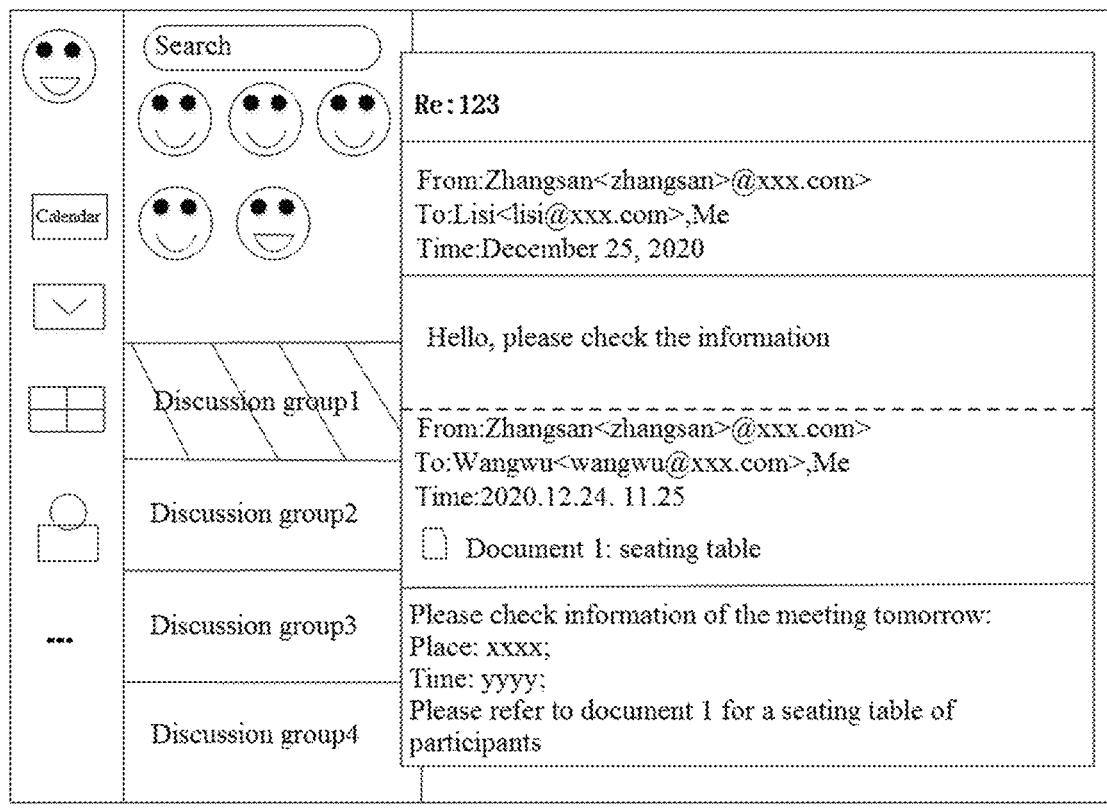

After the email group is forwarded to the target object in the card form, a forwarding destination user in the target object may view the email group corresponding to the message card. In a specific implementation, when a click operation on the message card made by the forwarding destination user in the object is detected, due to the identification information of the email group in the card, a request carrying the identification information is transmitted to the server; the email in the email group corresponding to the message card is obtained from the email server in response to the request. The content of the obtained email is displayed. FIG. 4(c) is a schematic diagram of a display interface after a detection of a click on the message card in the target object. In the display interface, a whole content of the email group corresponding to the message card is displayed.

In an embodiment, an email in the to-be-forwarded email group includes an enclosed document embedded in the body of the email.

In an embodiment, after the email group is forwarded to the target object and displayed in the target object, the method further includes: in response to a detection of a viewing trigger operation for the enclosed document by a forwarding destination user in the target object, determining whether a content of the enclosed document is displayed to the forwarding destination user, based on a permission of the forwarding destination user.

In an example, the determining whether a content of the enclosed document is displayed to the forwarding destination user, based on a permission of the forwarding destination user may include: transmitting a viewing request to a document server, to request the document server to authenticate a viewing permission of the forwarding destination user; and determining whether the content of the enclosed document is to be displayed based on an authentication result issued by the document server. The enclosed document is a shared document. When the viewing trigger operation for the enclosed document made by the forwarding destination user is detected, the authentication is performed on the forwarding destination user, and when the authentication succeeds the content of the enclosed document is displayed. In this way, a security of the content of the enclosed document is ensured.

In an embodiment, before making response to the detection of a viewing trigger operation for the enclosed document made by a forwarding destination user in the target object, the method further includes: displaying an abstract of the enclosed document in a body of the email. By displaying the abstract of the enclosed document, it is convenient for the forwarder to quickly know summary information of the enclosed document and determine whether to forward the enclosed document synchronously.

Figure 4D:
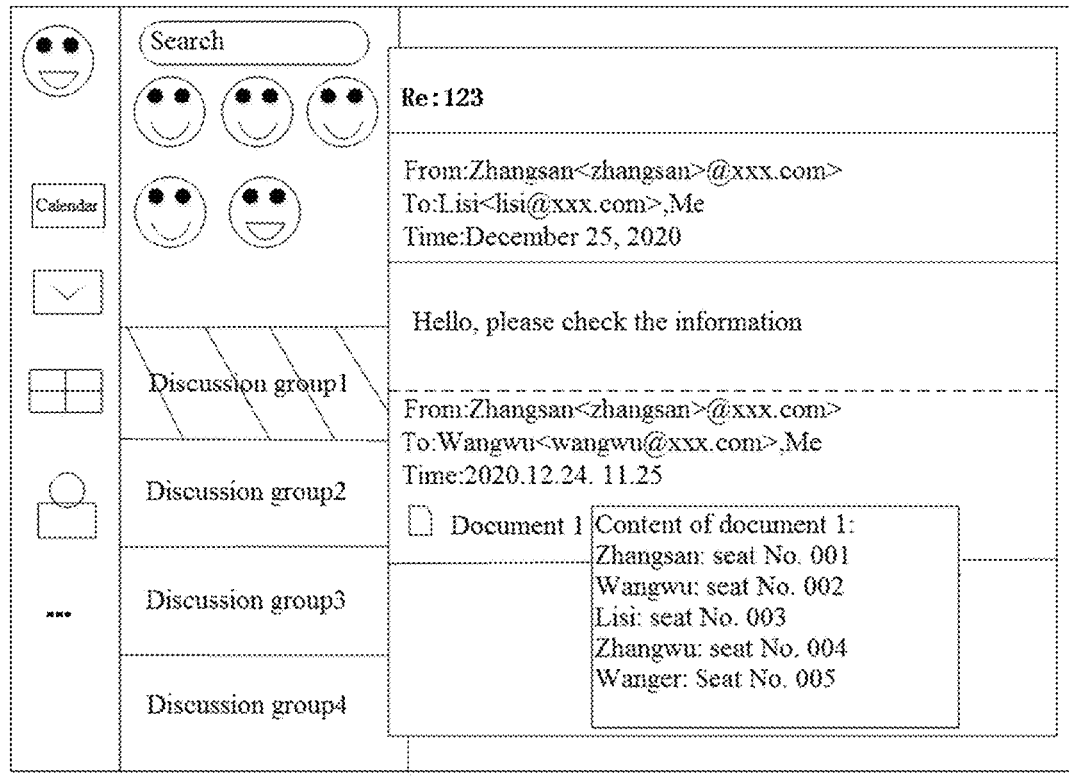

In an embodiment, the click operation for the message card made by a forwarding destination user in the target object is detected, and the content of the email is displayed correspondingly. In this case, if the email includes an enclosed document, only a subject of the enclosed document, rather than a full text thereof, is displayed in the email. As shown in FIG. 4(c), document 1 is used as an enclosed document in the second email in the email group. When the click operation for the message card made by a forwarding destination user in the target object is detected, only the subject "seating table" of document 1, rather than the text of document 1, is displayed. Only a specified forwarding destination user can view the enclosed document. Therefore, in response to a detection of a viewing trigger operation on the enclosed document made by a forwarding destination user in the target object, a viewing request is transmitted to the document server, and a viewing permission of the forwarding destination user is authenticated through the document server. The content of the enclosed document is displayed only, when the authentication performed by the document server succeeds and an instruction indicating success of the authentication is obtained. For example, FIG. 4(d) is a schematic diagram of a display interface for an enclosed document in a target object according to an embodiment. When a viewing trigger operation for the document 1 by forwarding destination user A in the target object is detected, a viewing permission of the forwarding destination user A is authenticated by the document server, and a body content of document 1 is displayed if it is determined that the forwarding destination user has the viewing permission. As shown in FIG. 4(d), specific information of the seating table in the document 1 is displayed for the forwarding destination user to view.

A method for forwarding an email is provided in the embodiments of the present disclosure. In the method, a to-be-forwarded email group and a target object are determined, and the email group is forwarded to the target object and displayed in the target object. Since the email group may include multiple emails, the multiple emails may be forwarded simultaneously with a simple and convenient operation, thereby improving the email forwarding efficiency and satisfying the working requirement of the users. A content of an email is directly displayed in response to a click operation of a forwarding destination user on a message card. In this way, a more convenient way is provided to viewing the email, so that user experience is further improved.

Embodiment 5

Figure 5:
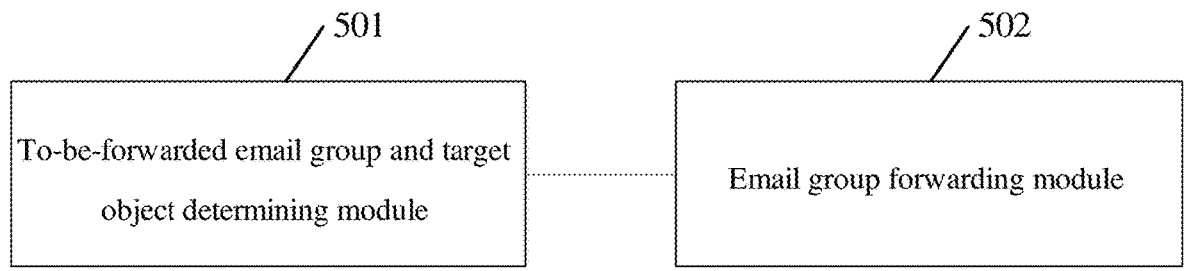
FIG. 5 is a schematic structural diagram of a device for forwarding an email according to a fifth embodiment of the present disclosure.

FIG. 5 is a schematic structural diagram of a device for forwarding an email according to an embodiment of the present disclosure. The device may be implemented in software and/or hardware, and may generally be integrated in an electronic device for performing the method. As shown in FIG. 5, the device may include a to-be-forwarded email group and target object determining module 501 and an email group forwarding module 502.

The to-be-forwarded email group and target object determining module 501 is configured to determine a to-be-forwarded email group and a target object, in response to a detection of an email forwarding operation, where the target object includes one or more of an instant messaging IM group and a target IM user.

The email group forwarding module 502 is configured to forward an email group to the target object and display the email group in the target object.

In an embodiment, when the to-be-forwarded email group is determined, the to-be-forwarded email group and target object determining module is further configured to receive a selection operation for the email group made by a forwarder through an email client interface; and determine the email group as the to-be-forwarded email group, based on the selection operation.

In an embodiment, when the to-be-forwarded email group is determined, the to-be-forwarded email group and target object determining module is further configured to: determine and display a recommended email group, where the recommended email group is an email group recommended to be forwarded; and determine the recommended email group as the to-be-forwarded email group, in response to a detection of a selection operation of a forwarder for the recommended email group.

In an embodiment, the recommended email group is determined based on historical behavior information of the forwarder.

In an embodiment, the device further includes a recommended email group determination module.

The recommended email group determination module is configured to: acquire historical email browsing information of the forwarder within a preset time period; determine, based on the historical email browsing information, an email group having a browsing count greater than a preset threshold; and determine the email group having the browsing count greater than the preset threshold, as the recommended email group.

In an embodiment, the device further includes a to-be-forwarded email determination module.

The to-be-forwarded email determination module is configured to determine a to-be-forwarded email selected by a forwarder from the to-be-forwarded email group.

The email group forwarding module is further configured to forward the to-be-forwarded email to the target object and display the to-be-forwarded email in the target object.

In an embodiment, the device further includes: an identification information transmission module.

The identification information transmission module is configured to acquire identification information of the to-be-forwarded email group.

The email group forwarding module is further configured to transmit, to an email server, a forwarding request carrying the identification information, to trigger the email server to forward the email group corresponding to the identification information to the target object through an IM server.

In an embodiment, the device further includes a to-be-forwarded email display module.

The to-be-forwarded email display module is configured to display the email group in the target IM group.

In an embodiment, when the email group is displayed in the target object, the email group forwarding module is further configured to display the email group in a form of a message card in the target object.

In an embodiment, the message card includes a subject of the email group and identification information of the email group.

In an embodiment, the device further includes an email content display module.

The email content display module is configured to display, in response to a detection of a viewing operation for the email group, an email content corresponding to the email group.

In an embodiment, an email in the to-be-forwarded email group includes an enclosed document.

The device further includes an authentication module.

The authentication module is configured to: determine, based on a permission of a forwarding destination user, whether a content of the enclosed document is displayed to the forwarding destination user, in response to a detection of a viewing trigger operation of a forwarding destination user for the enclosed document made in the target object.

In an embodiment, when whether a content of the enclosed document is displayed to the forwarding destination user is determined based on a permission of the forwarding destination user, the authentication module is further configured to: transmit a viewing request to a document server, to request the document server to authenticate a viewing permission of the forwarding destination user; and determine whether to the content of the enclosed document is displayed based on an authentication result issued by the document server. The enclosed document is a shared document.

In an embodiment, the enclosed document is embedded in a body of the email.

In an embodiment, the device further includes an enclosed document abstract display module.

The enclosed document abstract display module is configured to: display an abstract of the enclosed document in a body of the email, before making response to the detection of the viewing trigger operation of a forwarding destination user for the enclosed document in the target object.

In an embodiment, the device further includes an email group display module.

The email group display module is configured to display a subject, a recipient and sender of each email in the email group, for a forwarder to view a content of the email group.

In an embodiment, the device further includes a body hiding module.

The body hiding module is configured to hide bodies of multiple emails in the email group.

In an embodiment, when the target object is determined, the to-be-forwarded email group and target object determining module is further configured to determine an object selected by a forwarder through an email display interface of the to-be-forwarded email group, as the target object.

In an embodiment, the device further includes an automatic forwarding module.

The automatic forwarding module is configured to: forward, in response to a detection of a first email added to the email group, the first email to the target object and display the first email in the target object. The first email has same feature information as an email in the email group.

In an embodiment, the device further includes a forwarding setting determining module.

The forwarding setting determining module is configured to determine a forwarding setting of a forwarder, in response to the detection of a first email added to the email group.

In an embodiment, the device further includes an email adding module.

The email adding module is configured to receive an email adding operation triggered by a user; and add the first email to the email group in response to the email adding operation.

In an embodiment, the device further includes an email determination module.

The email determination module is configured to acquire the first email; and add the first email to the email group, in response to the first email having the same feature information as an email in the email group.

In an embodiment, the email group includes multiple associated emails having the same feature information.

In an embodiment, the same feature information includes at least one of: a same subject, sending times within a preset time range, a same sender, a same recipient, a replying reference relationship, and a forwarding reference relationship.

The device for forwarding the email in the embodiments of the present disclosure belongs to a same inventive concept as the method for forwarding the email provided in the above-mentioned embodiments. Reference may be made to the method embodiments for technical details not described in detail in the device embodiments of the present disclosure. The device embodiments in the present disclosure have same beneficial effects as the method embodiments in the present disclosure.

Embodiment 6

Figure 6:
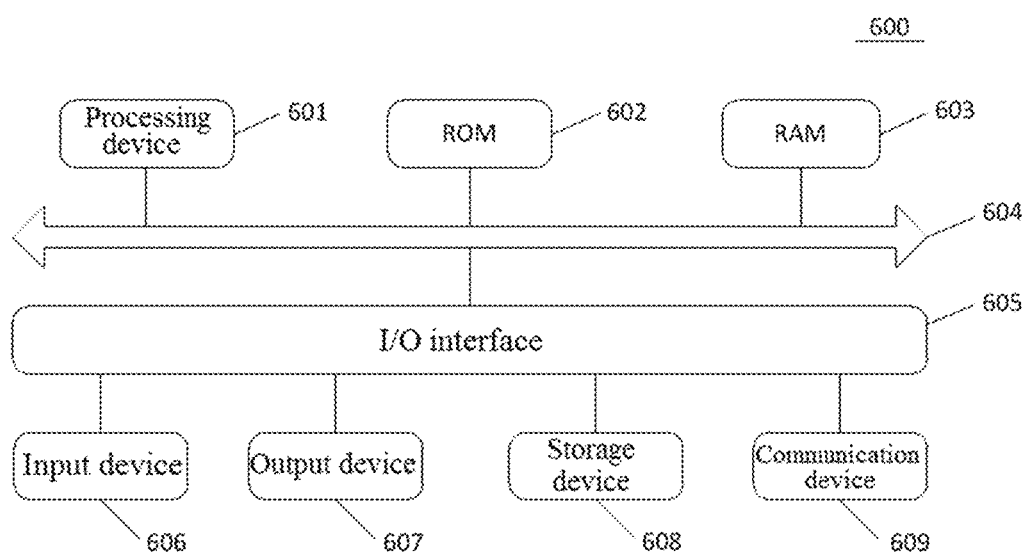
FIG. 6 is a schematic structural diagram of an electronic device according to a sixth embodiment of the present disclosure.

FIG. 6 shows a schematic structural diagram of an electronic device 600 applicable to an embodiment of the present disclosure. The electronic device according to the embodiment of the present disclosure may be a device corresponding to a back-end service platform of an application, or may be a mobile terminal device installed with an application client. Specifically, the electronic device may include, but is not limited to, a mobile phone, a laptop, a digital broadcast receiver, a PDA (personal digital assistant), a PAD (tablet), a PMP (portable multimedia player), a vehicle-mounted terminal (such as an in-vehicle navigation terminal) and other mobile terminals and fixed terminals such as a digital TV, a desktop computer. The electronic device shown in FIG. 6 is only exemplary, which should not indicate any limitation to the function and application scope of the embodiments of the present disclosure.

As shown in FIG. 6, the electronic device 600 may include a processing device 601, such as a central processing unit (CPU) or a graphics processor, which may execute various operations and processing based on a program stored in a Read Only Memory (ROM) 602 or a program loaded from a storage 608 into a random access memory (RAM) 603. The RAM 603 is further configured to store various programs and data required for an operation of the electronic device 600. The processing device 601, the ROM 602 and the RAM 603 are connected to each other via a bus 604. An Input/output (I/O) interface 605 is also connected to the bus 604.

Generally, the I/O interface 605 may be connected to: an input device 606 such as a touch screen, a touch panel, a keyboard, a mouse, a camera, a microphone, an accelerometer, and a gyroscope; an output device 607 such as a liquid crystal display (LCD), a speaker, and a vibrator; a storage device 608 such as a magnetic tape and a hard disk; and a communication device 609. The communication device 609 enables wireless or wired communication between the electronic device 600 and other devices for data exchanging. Although FIG. 6 shows an electronic device 600 with various components, it should be understood that the illustrated components are not necessarily required to all be implemented or embodied. Alternatively, more or fewer devices may be implemented or included.

Particularly, according to the embodiments of the present disclosure, the process described above in conjunction with flowcharts may be implemented as a computer program. For example, a computer program product is further provided as an embodiment in the present disclosure, including a computer program carried on a non-transitory computer readable medium. The computer program includes program code for performing a method shown in the flowcharts. In the embodiment, the computer program may be downloaded and installed from a network via the communication device 609, or installed from the storage 608, or installed from the ROM 602. When the computer program is executed by the processing device 601, the functions defined in the method according to the embodiments of the present disclosure are performed.

It is to be noted that, the computer readable medium mentioned herein may be a computer readable signal medium or a computer readable storage medium or any combination thereof. The computer readable storage medium may be, but is not limited to, a system, apparatus, or device in an electronic, magnetic, optical, electromagnetic, infrared, or semi-conductive form, or any combination thereof. More specifically, the computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device or any combination thereof. In the embodiments of the present disclosure, the computer readable storage medium may be any tangible medium containing or storing a program, and the program may be used by or in combination with an instruction execution system, apparatus, or device. In the embodiments of the present disclosure, the computer readable signal medium may be a data signal carrying computer readable program code transmitted in a baseband or transmitted as a part of a carrier wave. The transmitted data signal may be in various forms, including but not limited to an electromagnetic signal, an optical signal or any proper combination thereof. The computer-readable signal medium may be any computer-readable medium other than the computer-readable storage medium. The computer-readable signal medium may send, propagate or transmit a program for use by or use in combination with an instruction execution system, apparatus or device. The program code stored in the computer readable medium may be transmitted via any proper medium, including but not limited to a wire, an optical cable, radio frequency and the like, or any proper combination thereof.

In some embodiments, a client device and a server may communicate in any network protocol currently known or future developed, such as HTTP (Hyper Text Transfer Protocol), and may be interconnected with digital data communication in any form or medium (such as a communication network). Examples of a communication network include a local area network ("LAN"), a wide area networks ("WAN"), an internet (such as the Internet), and a peer-to-peer network (such as an ad hoc peer-to-peer network), and any network currently known or future developed.

The computer readable medium may be incorporated in the electronic device, or may exist alone without being assembled into the electronic device.

The computer-readable medium carries one or more programs. When the one or more programs are executed by the electronic device, an internal process of the electronic device is executed to: determine a to-be-forwarded email group and a target object, in response to a detection of an email forwarding operation triggered by a forwarder, where the target object includes one or more of a target instant messaging IM group and a target IM user; and forward the email group to the target object and display the email group in the target object.

The computer program code for performing the operations disclosed in the embodiments of the present disclosure may be written in one or more programming languages or combinations thereof. The programming languages include, but are not limited to, an object-oriented programming language such as Java, Smalltalk, and C++, and a conventional procedural programming language such as C language or a similar programming language. The program code may be executed entirely on a user computer, partially on the user computer, as a standalone software package, partially on the user computer and partially on a remote computer, or entirely on the remote computer or a server. In the case of involving a remote computer, the remote computer may be connected to a user computer via any kind of network including a local area network (LAN) or a wide area network (WAN), or may be connected to an external computer by using an Internet connection provided by an Internet service provider, for example.

The flowcharts and block charts in the drawings illustrate possible architecture, functions and operations implemented by the system, method and computer program product according to the embodiments of the present disclosure. In this regard, each block in a flowchart or a block diagram may represent a module, a program segment, or a part of code, and the module, the program segment, or the part of code includes one or more executable instructions for implementing specified logical functions. It should be noted that, in some alternative implementations, the functions marked in the blocks may be performed in an order different from the order shown in the drawings. For example, two blocks shown in succession may actually be executed in parallel, or sometimes may be executed in a reverse order, which depends on the functions involved. Besides, each box in a block diagram or a flowchart, and a combination of boxes in the block diagram or the flowchart, may be implemented by using a dedicated hardware-based system configured to perform a specified function or operation, or may be implemented by using a combination of dedicated hardware and a computer instruction.

The units mentioned in the description of the embodiments of the present disclosure may be implemented by means of software, or otherwise by means of hardware. In some circumstances, names of units do not constitute a limitation on the unit itself.

The functions described herein above may be performed, at least in part, by one or more hardware logic components. For example, an exemplary type of hardware logic components that may be used include but is not limited to: a Field Programmable Gate Array (FPGA), an Application Specific Integrated Circuits (ASIC), an Application Specific Standard Products (ASSP), a Systems on Chip (SOC), a Complex Programmable Logical Devices (CPLDs).

In the context of the present disclosure, the machine-readable medium may be a tangible medium, and may contain or store a program for use by or in combination with an instruction execution system, apparatus or device. The machine-readable medium may be a machine-readable signal medium or a machine-readable storage medium. The machine-readable media may include, but is not limited to, a system, apparatus, or device in an electronic, magnetic, optical, electromagnetic, infrared, or semiconductor form, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage, a magnetic storage, or any suitable combination thereof.

A method for forwarding an email is provided according to one or more of the embodiments of the present disclosure. The method includes:

determining a to-be-forwarded email group and a target object, in response to a detection of an email forwarding operation triggered by a forwarder, where the target object includes one or more of a target instant messaging IM group and a target IM user; and forwarding an email group to the target object and displaying the email group in the target object.

In the method according to one or more of the embodiments of the present disclosure, the determining a to-be-forwarded email group includes:

receiving a selection operation of a forwarder for the email group through an email client interface; and determining the email group as the to-be-forwarded email group, based on the selection operation.

In the method according to one or more of the embodiments of the present disclosure, the determining a to-be-forwarded email group includes:

determining and displaying a recommended email group, where the recommended email group is an email group recommended to be forwarded; and determining the recommended email group as the to-be-forwarded email group, in response to a detection of a selection operation of the forwarder for the recommended email group.

In the method according to one or more of the embodiments of the present disclosure, the recommended email group is determined based on historical behavior information of the forwarder.

In the method according to one or more of the embodiments of the present disclosure, the recommended email group is determined through following steps:

acquiring historical email browsing information of the forwarder within a preset time period;

determining, based on the historical email browsing information, an email group having a browsing count greater than a preset threshold; and determining the email group having the browsing count greater than the preset threshold as the recommended email group.

In the method according to one or more of the embodiments of the present disclosure, after determining a to-be-forwarded email group, the method further includes:

determining a to-be-forwarded email selected by a forwarder from the to-be-forwarded email group.

The forwarding the email group to the target object and displaying the email group in the target object includes:

forwarding the to-be-forwarded email to the target object and displaying the to-be-forwarded email in the target object.

In the method according to one or more of the embodiments of the present disclosure, in response to the detection of an email forwarding operation triggered by a forwarder, the method further includes:

acquiring identification information of the to-be-forwarded email group.

Correspondingly, the forwarding the email group to the target object and displaying the email group in the target object includes:

transmitting, to an email server, a forwarding request carrying the identification information, to trigger the email server to forward the email group corresponding to the identification information to the target object through an IM server.

In the method according to one or more of the embodiments of the present disclosure, after the transmitting, to an email server, a forwarding request carrying the identification information, the method further includes displaying the email group in the target object.

In the method according to one or more of the embodiments of the present disclosure, the displaying the email group in the target object includes: displaying the email group in a form of a message card in the target object.

In the method according to one or more of the embodiments of the present disclosure, the message card includes a subject of the email group and identification information of the email group.

In the method according to one or more of the embodiments of the present disclosure, after forwarding the email group to the target object, the method further includes: displaying, in response to a detection of a viewing operation for the email group, an email content corresponding to the email group.

In the method according to one or more of the embodiments of the present disclosure, an email in the to-be-forwarded email group includes an enclosed document.

After forwarding the email group to the target object and displaying the email group in the target object, the method further includes: determining, based on a permission of a forwarding destination user, whether a content of the enclosed document is displayed to the forwarding destination user, in response to a detection of a viewing trigger operation for the enclosed document made by the forwarding destination user in the target object.

In the method according to one or more of the embodiments of the present disclosure, the determining, based on a permission of a forwarding destination user, whether a content of the enclosed document is displayed to the forwarding destination user includes:

transmitting a viewing request to a document server, to request the document server to authenticate a viewing permission of the forwarding destination user; and determining whether the content of the enclosed document is to be displayed based on an authentication result issued by the document server, where the enclosed document is a shared document.

In the method according to one or more of the embodiments of the present disclosure, the enclosed document is embedded in a body of the email.

In the method according to one or more of the embodiments of the present disclosure, before making response to the detection of the viewing trigger operation for the enclosed document made by a forwarding destination user in the target object, the method further includes: displaying an abstract of the enclosed document in a body of the email.

In the method according to one or more of the embodiments of the present disclosure, after forwarding the email group to the target object, the method further includes: displaying a subject, a recipient and a sender of each email in the email group, for a forwarder to view a content of the email group.

In the method according to one or more of the embodiments of the present disclosure, the method further includes: hiding bodies of multiple emails in the email group.

In the method according to one or more of the embodiments of the present disclosure, the determining a target object includes: determining an object selected by the forwarder through an email display interface of the to-be-forwarded email group, as the target object.

In the method according to one or more of the embodiments of the present disclosure, after forwarding the email group to the target object, the method further includes:

forwarding, in response to a detection of a first email added to the email group, the first email to the target object and displaying the first email in the target object, where the first email has same feature information as an email in the email group.

In the method according to one or more of the embodiments of the present disclosure, before the first email is forwarded to the target object, the method further includes:

determining a forwarding setting of a forwarder in response to the detection of the first email added to the email group; and forwarding the first email to the target object, in response to an indication of the forwarding setting.

In the method according to one or more of the embodiments of the present disclosure, after the email group is forwarded to the target object, the method further includes: receiving an email adding operation triggered by a user; and adding the first email to the email group in response to the email adding operation.

In the method according to one or more of the embodiments of the present disclosure, before making response to the detection of the first email added to the email group, the method further includes: acquiring the first email; and adding the first email to the email group, in response to the first email having same feature information as an email in the email group.

In the method according to one or more of the embodiments of the present disclosure, the email group includes multiple associated emails having same feature information.

In the method according to one or more of the embodiments of the present disclosure, the same feature information includes at least one of: a same subject, sending times within a preset time range, a same sender, a same recipient, a replying reference relationship, and a forwarding reference relationship.

According to one or more of the embodiments of the present disclosure, a device for forwarding an email is provided. The device includes a to-be-forwarded email group and target object determining module and an email group forwarding module.

The to-be-forwarded email group and target object determining module is configured to determine a to-be-forwarded email group and a target object, in response to a detection of an email forwarding operation, where the target object includes one or more of a target instant messaging IM group and a target IM user.

The email group forwarding module is configured to forward an email group to the target object and display the email group in the target object.

In the device according to one or more of the embodiments of the present disclosure, when the to-be-forwarded email group is determined, the to-be-forwarded email group and target object determining module is further configured to: receive a selection operation for the email group made by a forwarder through an email client interface; and determine the email group as the to-be-forwarded email group, based on the selection operation.

In the device according to one or more of the embodiments of the present disclosure, when the to-be-forwarded email group is determined, the to-be-forwarded email group and target object determining module is further configured to: determine and display a recommended email group, where the recommended email group is an email group recommended to be forwarded; and determine the recommended email group as the to-be-forwarded email group, in response to a detection of a selection operation of a forwarder for the recommended email group.

In the device according to one or more of the embodiments of the present disclosure, the recommended email group is determined based on historical behavior information of the forwarder.

According to one or more of the embodiments of the present disclosure, the device further includes a recommended email group determination module.

The recommended email group determination module is configured to: acquire historical email browsing information of the forwarder within a preset time period; determine, based on the historical email browsing information, an email group having a browsing count greater than a preset threshold; and determine the email group having the browsing count greater than the preset threshold, as the recommended email group.

According to one or more of the embodiments of the present disclosure, the device further includes a to-be-forwarded email determination module.

The to-be-forwarded email determination module is configured to determine a to-be-forwarded email selected by a forwarder from the to-be-forwarded email group.

The email group forwarding module is further configured to forward the to-be-forwarded email to the target object and display the to-be-forwarded email in the target object.

According to one or more of the embodiments of the present disclosure, the device further includes an identification information transmission module.

The identification information transmission module is configured to acquire identification information of the to-be-forwarded email group.

The email group forwarding module is further configured to transmit, to an email server, a forwarding request carrying the identification information, to trigger the email server to forward the email group corresponding to the identification information to the target object through an IM server.

According to one or more of the embodiments of the present disclosure, the device further includes a to-be-forwarded email display module configured to display the email group in the target IM group.

According to one or more of the embodiments of the present disclosure, when the email group is displayed in the target object, the email group forwarding module is further configured to display the email group in a form of a message card in the target object.

According to one or more of the embodiments of the present disclosure, the message card includes a subject of the email group and identification information of the email group.

According to one or more of the embodiments of the present disclosure, the device further includes an email content display module configured to display, in response to a detection of a viewing operation for the email group, an email content corresponding to the email group.

According to one or more of the embodiments of the present disclosure, an email in the to-be-forwarded email group includes an enclosed document.

The device further includes an authentication module configured to: transmit a viewing request to a document server, and determine, based on a permission of the forwarding destination user, whether a content of the enclosed document is displayed to the forwarding destination user, in response to a detection of a viewing trigger operation of a forwarding destination user for the enclosed document in the target object.

According to one or more of the embodiments of the present disclosure, when whether a content of the enclosed document is displayed to the forwarding destination user is determined based on a permission of the forwarding destination user, the authentication module is further configured to: request the document server to authenticate a viewing permission of the forwarding destination user; and determine whether the content of the enclosed document is to be displayed based on an authentication result issued by the document server. The enclosed document is a shared document.

According to one or more of the embodiments of the present disclosure, the enclosed document is embedded in a body of the email.

According to one or more of the embodiments of the present disclosure, the device further includes an enclosed document abstract display module configured to: display an abstract of the enclosed document in a body of the email, before making response to the detection of a viewing trigger operation of a forwarding destination user for the enclosed document in the target object.

According to one or more of the embodiments of the present disclosure, the device further includes an email group display module configured to display a subject, a recipient and sender of each email in the email group, for a forwarder to view a content of the email group.

According to one or more of the embodiments of the present disclosure, the device further includes a body hiding module configured to hide bodies of multiple emails in the email group.

According to one or more of the embodiments of the present disclosure, when the target object is determined, the to-be-forwarded email group and target object determining module is further configured to determine an object selected by a forwarder through an email display interface of the to-be-forwarded email group, as the target object.

According to one or more of the embodiments of the present disclosure, the device further includes: an automatic forwarding module configured to forward, in response to a detection of a first email added to the email group, the first email to the target object and display the first email in the target object. The first email has same feature information as an email in the email group.

According to one or more of the embodiments of the present disclosure, the device further includes a forwarding setting determining module configured to determine a forwarding setting of a forwarder, in response to the detection of a first email added to the email group.

According to one or more of the embodiments of the present disclosure, the device further includes an email adding module configured to receive an email adding operation triggered by a user; and add the first email to the email group according to the email adding operation.

According to one or more of the embodiments of the present disclosure, the device further includes an email determination module configured to acquire the first email; and add the first email to the email group, in response to the first email having the same feature information as an email in the email group.

According to one or more of the embodiments of the present disclosure, the email group includes multiple associated emails having the same feature information.

According to one or more of the embodiments of the present disclosure, the same feature information includes at least one of: a same subject, sending times within a preset time range, a same sender, a same recipient, a replying reference relationship, and a forwarding reference relationship.

An electronic device is provided according to one or more of the embodiments of the present disclosure. The electronic device includes: one or more processors; and a storage device configured to store one or more programs. The one or more programs, when executed by the one or more processors, cause the one or more processors to perform the method for forwarding the email according to any one of the embodiments of the present disclosure.

A computer-readable storage medium is provided according to one or more of the embodiments of the present disclosure. The computer-readable storage medium stores a computer program. The computer program, when executed by a processor, performs the method for forwarding the email according to any one of the embodiments of the present disclosure.

The above description includes merely preferred embodiments of the present disclosure and explanations of technical principles thereof. Those skilled in the art should understand that the scope of the present disclosure is not limited to technical solutions formed by the specific combination of technical features, but shall cover other technical solutions formed by any combination of the above technical features or their equivalents without departing from the inventive concept of the present disclosure. For example, a technical solution formed by interchanging the features and technical features having similar functions as disclosed (not limiting) with each other is also covered within the scope of the present disclosure.

In addition, although operations are depicted in a particular order, this should not be construed as requiring the operations to be performed in the particular order as shown or in a sequential order. In a certain circumstance, multi-tasking and parallel processing may be advantageous. Similarly, although the above discussion provides details in implementations, these should not be construed as limitations on the scope of the present disclosure. Features described in the context of embodiments may be implemented in a combination in a single embodiment, and various features described in the context of a single embodiment may be implemented in multiple embodiments separately or in any suitable sub-combination.

Although the subject matter has been described in language specific to structural features and/or logical acts of a method, it is to be understood that the subject matter defined in the appended claims is not necessarily limited to the specific features or operations described above. The specific features and operations described above are merely example forms for implementing the claims.

The invention claimed is:

1. A method for forwarding an email, comprising:
    determining a to-be-forwarded email group and a target object, in response to a detection of an email forwarding operation, wherein the target object comprises one or more of a target instant messaging IM group and a target IM user; and
    forwarding an email group to the target object and displaying the email group in the target object,
    wherein the determining a to-be-forwarded email group comprises:
        determining a recommended email group by using an email recommendation strategy and displaying the determined recommended email group on an email client interface of a forwarder, wherein the recommended email group is an email group recommended to be forwarded; and
        determining the recommended email group as the to-be-forwarded email group, in response to a detection of a selection operation of the forwarder for the recommended email group,
    wherein the displaying the email group in the target object comprises:
        displaying the email group in a form of a message card in the target object; and
        acquiring emails in the email group corresponding to the message card from an email server, in response to a triggering operation for the message card; and
        displaying content of the acquired emails,
    wherein the recommended email group is determined by:
        acquiring historical email browsing information of the forwarder within a preset time period;
        determining, based on the historical email browsing information, an email group having a browsing count greater than a preset threshold; and
        determining the email group having the browsing count greater than the preset threshold, as the recommended email group, and
    wherein an email in the to-be-forwarded email group comprises an enclosed document, and wherein
    after the forwarding the email group to the target object and displaying the email group in the target object, the method further comprises:
        determining, based on a permission of a forwarding destination user, whether a content of the enclosed document is displayed to the forwarding destination user, in response to a detection of a viewing trigger operation for the enclosed document made by a forwarding destination user in the target object.

2. The method according to claim 1, wherein the determining a to-be-forwarded email group comprises:
    receiving a selection operation of the forwarder for the email group through an email client interface; and
    determining the email group as the to-be-forwarded email group, based on the selection operation.

3. The method according to claim 1, wherein after the determining a to-be-forwarded email group, the method further comprises:
    determining a to-be-forwarded email selected by a forwarder from the to-be-forwarded email group; and
    the forwarding the email group to the target object and displaying the email group in the target object comprises:
    forwarding the to-be-forwarded email to the target object and displaying the to-be-forwarded email in the target object.

4. The method according to claim 1, wherein, in response to the detection of the email forwarding operation, the method further comprises:
    acquiring identification information of the to-be-forwarded email group; and
    the forwarding the email group to the target object and displaying the email group in the target object comprises:
    transmitting, to an email server, a forwarding request carrying the identification information, to trigger the email server to forward the email group corresponding to the identification information to the target object through an IM server.

5. The method according to claim 4, wherein after the transmitting, to an email server, a forwarding request carrying the identification information, the method further comprises:
displaying the email group in the target object.

6. The method of claim 1, wherein the message card comprises a subject of the email group and identification information of the email group.

7. The method according to claim 1, wherein after the forwarding the email group to the target object, the method further comprises:
displaying, in response to a detection of a viewing operation for the email group, an email content corresponding to the email group.

8. The method according to claim 1, wherein the determining, based on a permission of a forwarding destination user, whether a content of the enclosed document is displayed to the forwarding destination user comprises:
transmitting a viewing request to a document server, to request the document server to authenticate a viewing permission of the forwarding destination user; and
determining whether the content of the enclosed document is to be displayed based on an authentication result issued by the document server, wherein the enclosed document is a shared document.

9. The method according to claim 1, wherein the enclosed document is embedded in a body of the email.

10. The method according to claim 8, wherein before making response to the detection of the viewing trigger operation for the enclosed document made by the forwarding destination user in the target object, the method further comprises:
displaying an abstract of the enclosed document in a body of the email.

11. The method according to claim 1, wherein after the forwarding the email group to the target object, the method further comprises:
displaying a subject, a recipient and a sender of each email in the email group, for a forwarder to view a content of the email group.

12. The method according to claim 11, further comprising:
hiding bodies of a plurality of emails in the email group.

13. The method according to claim 1, wherein the determining a target object comprises:
determining an object selected by a forwarder through an email display interface of the to-be-forwarded email group, as the target object.

14. The method according to claim 1, wherein after the forwarding the email group to the target object, the method further comprises:
forwarding, in response to a detection of a first email added to the email group, the first email to the target object and displaying the first email in the target object, wherein the first email has same feature information as an email in the email group.

15. The method according to claim 14, wherein the forwarding, in response to a detection of a first email added to the email group, the first email to the target object comprises:
determining a forwarding setting of a forwarder, in response to the detection of the first email added to the email group; and
forwarding the first email to the target object, in response to an indication of the forwarding setting.

16. The method according to claim 14, further comprising:
receiving an email adding operation triggered by a user; and
adding the first email to the email group in response to the email adding operation.

17. The method according to claim 14, wherein before making response to the detection of the first email added to the email group, the method further comprises:
acquiring the first email; and
adding the first email to the email group, in response to the first email having same feature information as an email in the email group.

18. The method according to claim 1, wherein the email group comprises a plurality of associated emails having same feature information.

19. The method according to claim 14, wherein same feature information comprises at least one of: a same subject, sending times within a preset time range, a same sender, a same recipient, a replying reference relationship, and a forwarding reference relationship.

20. The method according to claim 1, wherein the recommended email group is determined based on historical behavior information of the forwarder.

21. A device for forwarding an email, comprising:
one or more processors; and
a storage device configured to store one or more programs, wherein
the one or more programs, when executed by the one or more processors, cause the one or more processors to
determine a to-be-forwarded email group and a target instant messaging IM group, in response to a detection of an email forwarding operation, wherein the email group comprises a plurality of associated emails having same feature information; and
forward the email group to the target IM group and display the email group in the target IM group,
wherein the one or more programs, when executed by the one or more processors, cause the one or more processors further to:
determine a recommended email group by using an email recommendation strategy and display the determined recommended email group on an email client interface of a forwarder, wherein the recommended email group is an email group recommended to be forwarded; and
determine the recommended email group as the to-be-forwarded email group, in response to a detection of a selection operation of the forwarder for the recommended email group,
wherein the one or more programs, when executed by the one or more processors, cause the one or more processors further to:
display the email group in a form of a message card in the target object; and
acquire emails in the email group corresponding to the message card from an email server, in response to a triggering operation for the message card; and display content of the acquired emails,
wherein the recommended email group is determined by:
acquiring historical email browsing information of the forwarder within a preset time period;
determining, based on the historical email browsing information, an email group having a browsing count greater than a preset threshold; and
determining the email group having the browsing count greater than the preset threshold, as the recommended email group, and wherein an email in the to-be-forwarded email group comprises an enclosed document, and wherein the one or more programs, when executed by the one or more processors, cause the one or more processors further to:

after the forwarding the email group to the target object and displaying the email group in the target object, determine, based on a permission of a forwarding destination user, whether a content of the enclosed document is displayed to the forwarding destination user, in response to a detection of a viewing trigger operation for the enclosed document made by a forwarding destination user in the target object.

22. A non-transitory computer-readable storage medium having a computer program stored thereon, wherein the computer program, when executed by a processor, cause the processor to determine a to-be-forwarded email group and a target object, in response to a detection of an email forwarding operation, wherein the target object comprises one or more of a target instant messaging IM group and a target IM user; and forward an email group to the target object and display the email group in the target object, wherein the computer program, when executed by a processor, cause the processor further to determine a recommended email group by using an email recommendation strategy and display the determined recommended email group on an email client interface of a forwarder, wherein the recommended email group is an email group recommended to be forwarded; and determine the recommended email group as the to-be-forwarded email group, in response to a detection of a selection operation of the forwarder for the recommended email group, wherein the computer program, when executed by a processor, cause the processor further to:

display the email group in a form of a message card in the target object; and acquire emails in the email group corresponding to the message card from an email server, in response to a triggering operation for the message card; and display content of the acquired emails, wherein the recommended email group is determined by:

acquiring historical email browsing information of the forwarder within a preset time period;

determining, based on the historical email browsing information, an email group having a browsing count greater than a preset threshold; and determining the email group having the browsing count greater than the preset threshold, as the recommended email group, and wherein an email in the to-be-forwarded email group comprises an enclosed document, and wherein the computer program, when executed by a processor, cause the processor further to:

after the forwarding the email group to the target object and displaying the email croup in the target object, determine, based on a permission of a forwarding destination user, whether a content of the enclosed document is displayed to the forwarding destination user, in response to a detection of a viewing trigger operation for the enclosed document made by a forwarding destination user in the target object.

* * * * *